United States Patent
Thacker et al.

(10) Patent No.: US 9,519,449 B2
(45) Date of Patent: *Dec. 13, 2016

(54) NETWORK PRINTER SYSTEM

(71) Applicant: Static Control Components, Inc., Sanford, NC (US)

(72) Inventors: William Eli Thacker, Sanford, NC (US); Scott M. Babish, Fuquay Varina, NC (US)

(73) Assignee: Static Control Components, Inc., Sanford, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,560

(22) Filed: Jun. 22, 2015

(65) Prior Publication Data

US 2015/0286453 A1   Oct. 8, 2015

Related U.S. Application Data

(63) Continuation of application No. 14/478,949, filed on Sep. 5, 2014, now Pat. No. 9,063,462, which is a continuation-in-part of application No. 14/095,413, filed on Dec. 3, 2013, now Pat. No. 8,891,982, which is a continuation-in-part of application No. 13/667,238, filed on Nov. 2, 2012, now Pat. No. 8,905,511, which is a continuation-in-part of application No. 13/538,347, filed on Jun. 29, 2012, now Pat. No. 9,104,174.

(51) Int. Cl.
*G06F 3/12* (2006.01)
*G03G 15/08* (2006.01)
*G03G 15/00* (2006.01)
*B41J 2/175* (2006.01)
*B41J 29/38* (2006.01)

(52) U.S. Cl.
CPC .......... *G06F 3/1293* (2013.01); *B41J 2/17543* (2013.01); *B41J 2/17546* (2013.01); *B41J 29/38* (2013.01); *G03G 15/0856* (2013.01); *G03G 15/0863* (2013.01); *G03G 15/5004* (2013.01); *G03G 15/5079* (2013.01); *G03G 15/553* (2013.01); *G03G 15/556* (2013.01)

(58) Field of Classification Search
None
See application file for complete search history.

(56) References Cited

U.S. PATENT DOCUMENTS

| | | | | |
|---|---|---|---|---|
| 4,791,453 | A * | 12/1988 | Koseki | G03G 15/2003 347/900 |
| 6,361,138 | B1 | 3/2002 | Seino et al. | |
| 6,631,967 | B1 | 10/2003 | Saruta | |
| 7,315,708 | B2 * | 1/2008 | Burchette | G03G 15/553 399/109 |

(Continued)

FOREIGN PATENT DOCUMENTS

WO   2006091879 A2   8/2006

*Primary Examiner* — Walter L Lindsay, Jr.
*Assistant Examiner* — Jas Sanghera

(57) ABSTRACT

Electronic systems, such as printing systems, often use components that have integral memory. The integral memory can be used to store information about the component. In some printing systems this memory includes a portion that stores a value indicative of a print yield. Disclosed is a method and system for allowing the memory to have data indicative of an increased print yield.

2 Claims, 14 Drawing Sheets

(56) References Cited

U.S. PATENT DOCUMENTS

| | | | |
|---|---|---|---|
| 9,063,462 B2* | 6/2015 | Thacker | G03G 15/0863 |
| 2002/0015067 A1 | 2/2002 | Studholme et al. | |
| 2005/0207786 A1* | 9/2005 | Askren | G03G 15/0855 |
| | | | 399/119 |
| 2009/0153602 A1 | 6/2009 | Brown et al. | |
| 2014/0002537 A1 | 1/2014 | Thacker et al. | |
| 2014/0003836 A1 | 1/2014 | Burchette | |

* cited by examiner

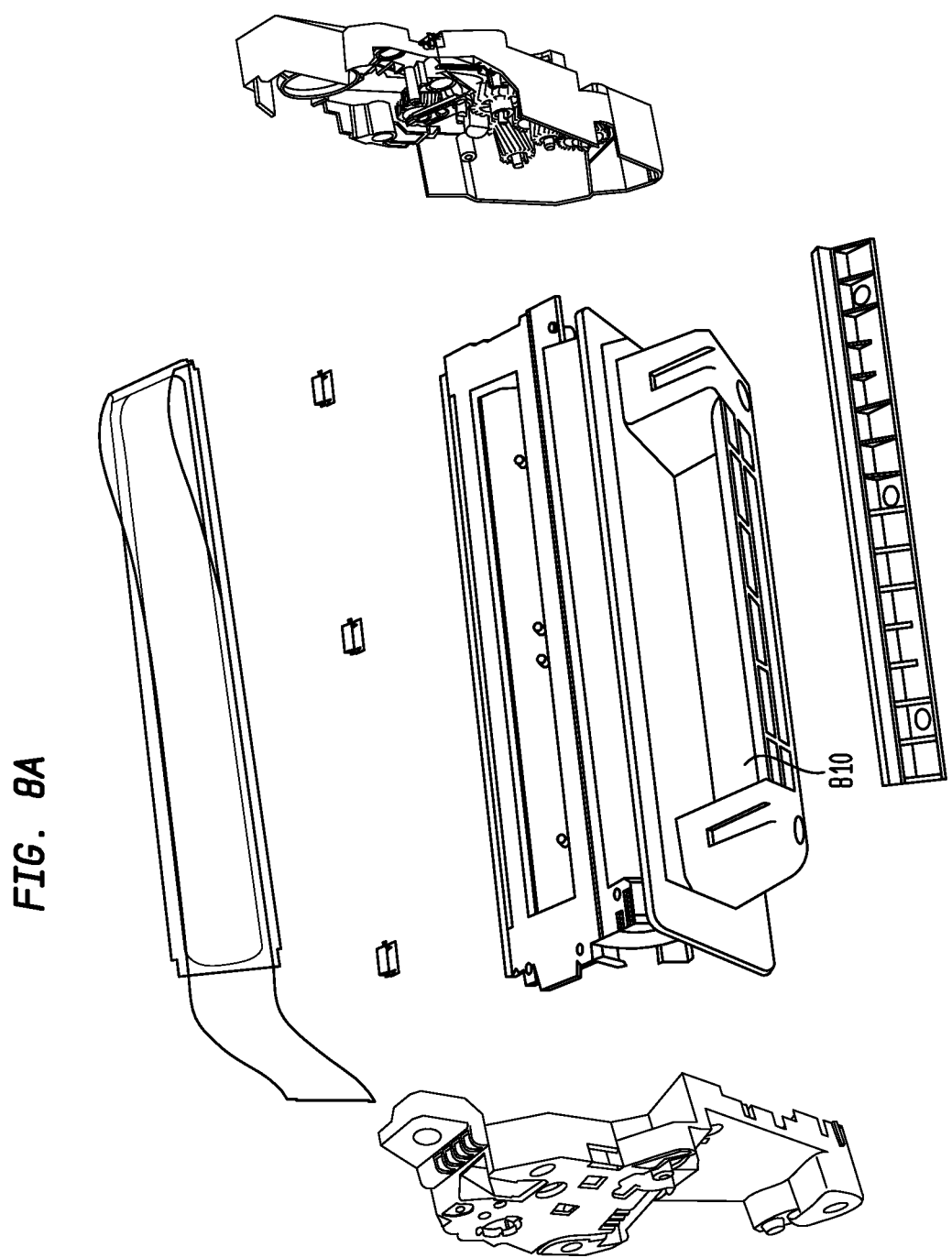

|    | x0 | x1 | x2 | x3 | x4 | x5 | x6 | x7 | x8 | x9 | xA | xB | xC | xD | xE | xF |
|----|----|----|----|----|----|----|----|----|----|----|----|----|----|----|----|----|
| 0x | 00 | A0 | 43 | 85 | 0E | 00 | 00 | 01 | 00 | 00 | 70 | 17 | AA | 5D | 33 | 97 |
| 1x | 2A | 65 | CC | 00 | 00 | 00 | 00 | 00 | 1B | 21 | 1C | 48 | 25 | 4B | 05 | A5 |
| 2x | 04 | 01 | 2B | 62 | 30 | 36 | 36 | 42 | 64 | 00 | 0B | 02 | 00 | 52 | 11 | 2C |
| 3x | 00 | 00 | 00 | 00 | 00 | 00 | 00 | 00 | 00 | 00 | 00 | 00 | 00 | 00 | 00 | 00 |
| 4x | 00 | 00 | 00 | 00 | 00 | 00 | 00 | 00 | 00 | 00 | 00 | 00 | 00 | 00 | 00 | 00 |
| 5x | 00 | 00 | 00 | 00 | 00 | 00 | 00 | 00 | 3D | 00 | 00 | 03 | FF | C0 | 47 | 00 |
| 6x | 00 | 00 | 00 | 00 | 00 | 00 | 4C | 00 | 00 | 00 | 00 | 00 | 00 | 00 | 00 | 00 |
| 7x | 00 | 00 | 00 | 00 | 00 | 00 | 00 | 00 | F9 | 16 | A7 | FF | 00 | 00 | 00 | 00 |

FIG. 11

NETWORK PRINTER SYSTEM

RELATED APPLICATIONS

This patent application claims priority to and is a continuation of co-pending U.S. patent application Ser. No. 14/478,949, entitled "NETWORK PRINTER SYSTEM," filed on Sep. 5, 2014, which claims priority to and is a continuation-in-part of U.S. patent application Ser. No. 14/095,413, entitled "NETWORK PRINTER SYSTEM," filed on Dec. 3, 2013, which claims priority to and is a continuation-in-part of U.S. patent application Ser. No. 13/667,238, entitled "NETWORK PRINTER SYSTEM," filed on Nov. 2, 2012, which claims priority to and is a continuation-in-part of U.S. patent application Ser. No. 13/538,347, entitled "REFILLED TONER CARTRIDGE HAVING INCREASED YIELD," filed on Jun. 29, 2012, the disclosures of each of which are hereby incorporated herein by reference in their entireties.

BACKGROUND

Image recording devices, such as laser printers, use a replaceable cartridge containing a recording material to record an image on a recording medium.

Electrostatic or laser printers form an image on a recording medium by transferring toner particles onto the medium. Typically, a recording drum is charged and a latent image is formed on the drum by a laser. The latent image is developed on the drum by developer or toner particles and this image is transferred directly or indirectly onto a recording medium. In color printers multiple cartridges are provided to transfer color images.

A print cartridge often includes a memory device. This memory device may be loaded with information indicative of the cartridge parameters. When the printer detects that a new cartridge has been installed, the printer reads the information from the memory device. This information can be used to calibrate the operation of the printing device based upon the cartridge parameters. Often, the memory device includes information related to the cartridge capacity. The printer may read the cartridge capacity and print a status page telling the user information about the cartridge. The status page may include information such as manufacture date, cartridge type, and estimated page count for the cartridge.

The information stored in the memory may also be used to monitor the print life of the cartridge. One method of monitoring usage of a print cartridge is to count the amount of printing that is performed. In an electrostatic printer a counter may count the number of pixels, lines, or pages printed by each cartridge. Each of the numbers counted is then processed as a count signal and the printer sends each of the count signals to the appropriate cartridge. The cartridge contains a memory that stores an initial value indicative the amount of printing agent contained in the cartridge. The printer uses the initial value and the number of pages or lines printed to determine a remaining life of the cartridge. When the cartridge gets to a low level, the printer may warn an operator to replace the cartridge and eventually prevent the cartridge from being used.

A used print cartridge contains many parts that have a useful life after the first use. It is desirable to refill or remanufacture these used print cartridges. This provides a less expensive alternative than purchasing new print cartridges, and reduces waste. When refilling a print cartridge, it is advantageous to provide a cartridge that has an increased print life. In an ink jet printer, the print life can be increased by adding more ink than cartridge was originally filled with or by using ink that has a higher print efficiency. In a laser printer, the print life can be extended by filling the cartridge with additional toner or by using toner that has an increased print efficiency.

When it is desired to provide a higher yield cartridge, it is necessary to change the initial value stored in the memory. If a cartridge has the capacity to record and increased number of pages and the initial value indicated by the printer does not reflect this increased capacity, the printer may prevent the cartridge from realizing its full print life. Also, if the information stored in the memory does indicate an increased print capacity, the status page printed will not reflect the proper page count.

Image recording devices are also often connected to one more device via a network. In setting such as office buildings, it is common to have multiple image recording devices of various types connected to the network. It is desirable to have the network manage these printers to ensure that printing is performed by the most suitable or most economical printing device.

There are third providers to manage these networks of imaging devices. These third parties, often referred to as managed print service providers (MPS), manage and maintain a network of imaging devices. MPS providers monitor the printing network and provide replacement print cartridges and may service the printers. The MPS provider charges the user on a page printed basis.

It is desirable for an MPS provider to use remanufactured print cartridges to reduce costs and environmental impact. Also, it is desirable for the MPS provider to use high yield print cartridges because this reduces the frequency of cartridge replacement and cartridge refilling. However, it is important that the MSP provider accurately predict the end of life in the high yield print cartridge.

Therefore, on object of the invention is to provide a high yield print cartridge that displays the proper information on the status page and that prints until the cartridge is empty, or almost empty, of recording material.

SUMMARY

The present method and system allows a refilled print cartridge to provide a yield different than the original yield of the print cartridge. For example, the refilled print cartridge can be a high yield print cartridge that is capable of printing more sheets than standard yield print cartridge. This high yield print cartridge may be used in network printing devices.

In one aspect of the application, the method includes refilling a toner cartridge having a waste bin, a hopper, and a cartridge chip, the cartridge chip includes a memory that stores information indicative of an initial amount of toner loaded in the toner cartridge, wherein a size of the waste bin limits a maximum amount of toner that may loaded into the hopper. The method includes determining a toner capacity of the waste bin, determining a coverage efficiency of a toner to be loaded in the hopper, and determining a maximum amount of toner that the hopper can be loaded with, wherein the maximum amount of toner is determined based on the toner capacity of the waste bin and the coverage efficiency of the toner. The hopper is loaded with a new amount of toner that is greater than an amount of toner that was originally loaded in the hopper by the original manufacturer. A replacement cartridge chip is provided and the replacement cartridge chip includes a memory that contains information indicative of the new amount of toner or the new page yield.

In another aspect the method includes refilling a toner cartridge having a waste bin, a hopper, and a cartridge chip, the cartridge chip includes a memory that stores information indicative of an initial amount of toner loaded in the toner cartridge, wherein a size of the waste bin limits a maximum amount of toner that may be loaded into the hopper. The method includes determining a toner capacity of the waste bin, selecting a toner to be loaded into the hopper, wherein the selected toner has predetermined coverage efficiency, and determining a maximum amount of toner that the hopper can be loaded with, wherein the maximum amount of toner is determined based on the toner capacity of the waste bin and the coverage efficiency of the toner. The hopper is loaded with a new amount of toner that is greater than an amount of toner that was originally loaded in the hopper by the original manufacturer. A replacement cartridge chip having a memory that contains information indicative of the new page yield or the new amount of toner is provided on the toner cartridge.

In another aspect the method includes refilling a toner cartridge having a waste bin, a hopper, and a cartridge chip. The method includes providing a replacement toner that has one or more characteristic and filling the hopper with a quantity of replacement toner. A cartridge life is determined based upon the quantity of replacement toner and the toner characteristic. The information indicative of an initial amount of toner loaded is updated in the cartridge chip memory based on the determined cartridge life.

In one aspect of the present application a toner cartridge is for use in an image forming apparatus. The toner cartridge includes a waste bin having a toner capacity, a hopper having a toner capacity, and a cartridge chip. The hopper is initially loaded with a toner having a coverage efficiency and the cartridge chip has a memory for storing information indicative of an amount toner loaded in the hopper. The hopper has a greater toner capacity than the waste bin and the hopper is loaded with an amount of toner based upon the capacity of the waste bin and the toner coverage efficiency.

In another aspect a refilled toner cartridge is for use in an image forming apparatus. The refilled toner cartridge has a waste bin having a toner capacity, a hopper having a toner capacity, and a cartridge chip having a memory for storing information indicative of an initial amount loaded in the hopper. The hopper is loaded with a quantity of replacement toner having at least one characteristic that is different than a characteristic of a toner originally loaded in the toner cartridge. The information indicative of an initial amount toner is changed based upon the at least one characteristic of the replacement toner.

In another embodiment, the "cartridge" is not a print cartridge but another element in the printer that has a finite amount use. For example, printers use rollers to feed a recording medium through the print zone. The rollers may work by using friction to force the recording medium through the printer. The surface of the rollers is often a material like plastic or rubber that wears out through the life of the printer.

In another aspect of the invention a system for determining an accurate amount of consumable in a print cartridge is disclosed. The system includes a printing device having a print cartridge loaded therein. The print cartridge has a cartridge identification associated therewith. The system further includes a processor and a peripheral device between the at least one printing device and the processor to monitor communication between the processor and the printing device, wherein the peripheral device determines an accurate amount of remaining consumable by monitoring the communication between the processor and the printing device.

In another aspect of the invention a system for determining an accurate amount of consumable in a print cartridge is disclosed. The system includes a printing device having a print cartridge loaded therein. The print cartridge has an identifier or a cartridge identification associated therewith. The system further includes a processor. The processer includes software and monitors communication between the processor and the printing device. The processor determines an accurate amount of remaining consumable by monitoring the communication between the processor and the printing device based upon cartridge identification.

In another aspect of the invention, the presence of an identification notifies a virtual printer or MPS system that a cartridge with a custom yield is in use and allow the MPS to properly report the toner levels and to properly interpret when the cartridge will go 'low' and 'out'. The presence of this identification enables an MPS system to more accurately determine toner remaining to avoid premature cartridge replacement.

The presence of the identification enables the MPS system to determine that the cartridge was remanufactured by a certain company. Additionally, the presence of this identification enables the MPS system to determine that the cartridge should preferably be recycled by or returned to a certain company, with information and phone number for the remanufacturer.

The presence of the identification may enable the MPS system to change printer messages, LCD, warning lights, etc. that the printer might present to the printer operator. Furthermore, the presence of this identification enables the MPS system to override the message that a user, issuing the print job, would receive on their computer.

The system and method also allows the MPS system to refuse print jobs, withhold status information for the printer, route the printer job to specific printers, and enable users to print on specific printers only.

The system and method also enables the MPS system to reset the printer, at some point in the life of the cartridge, (or request user intervention to reset the printer) so the identification could adjust some parameters to reflect it proper yield information. The MPS system identifies the chip and a specific condition, such as low toner or such as that a specific number of pages has been printed. The MPS system sends a message to the MPS provider, the end user, or both, telling the end user to open the cover of the printer, power off the printer, or take out the cartridge and put it back in. The remaining count in the chip is then reset to a higher count.

The system and method also enables the MPS system to effect other printer status presentations such as: supplies status page, printers internal web server, and printer tool software.

In another embodiment, a print cartridge is "married" to the MPS system and will not work outside of the MPS system. This prevents a print cartridge from being used outside of the MPS system for printing unauthorized pages or for being used without the MPS system's knowledge.

In another embodiment, the simple network management protocol and management information base provided with the printer is used to identify a high yield print cartridge.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention:

FIG. 8a illustrates a toner cartridge having a standard hopper and FIG. 8b illustrates a toner cartridge having an extended yield hopper;

FIG. 11 illustrates data stored in a cartridge chip;

DETAILED DESCRIPTION OF THE DRAWINGS

In imaging and printing devices, page counts recorded by non-volatile memory modules ("memory modules") may be incremented as pages are printed. Page counts may include the total number of pages printed by a printer and the total number of pages printed for each of a number of print categories. Recording the number of pages for individual print categories permits the recording of page counts for specific types of printing tasks, such as the total number of color pages, monochrome pages, letter size pages, legal size pages, transparencies, etc., that may be printed. In addition to recording page counts, non-volatile memory modules may be packaged with reservoirs such as ink or toner cartridges, and the memory modules may contain one or more fields for recording the depletion of the reservoirs. It will be appreciated by one of ordinary skill in the art that imaging and printing devices may contain non-volatile memory modules that have one or more counts, resource bit fields, or a combination thereof.

Figure 1:
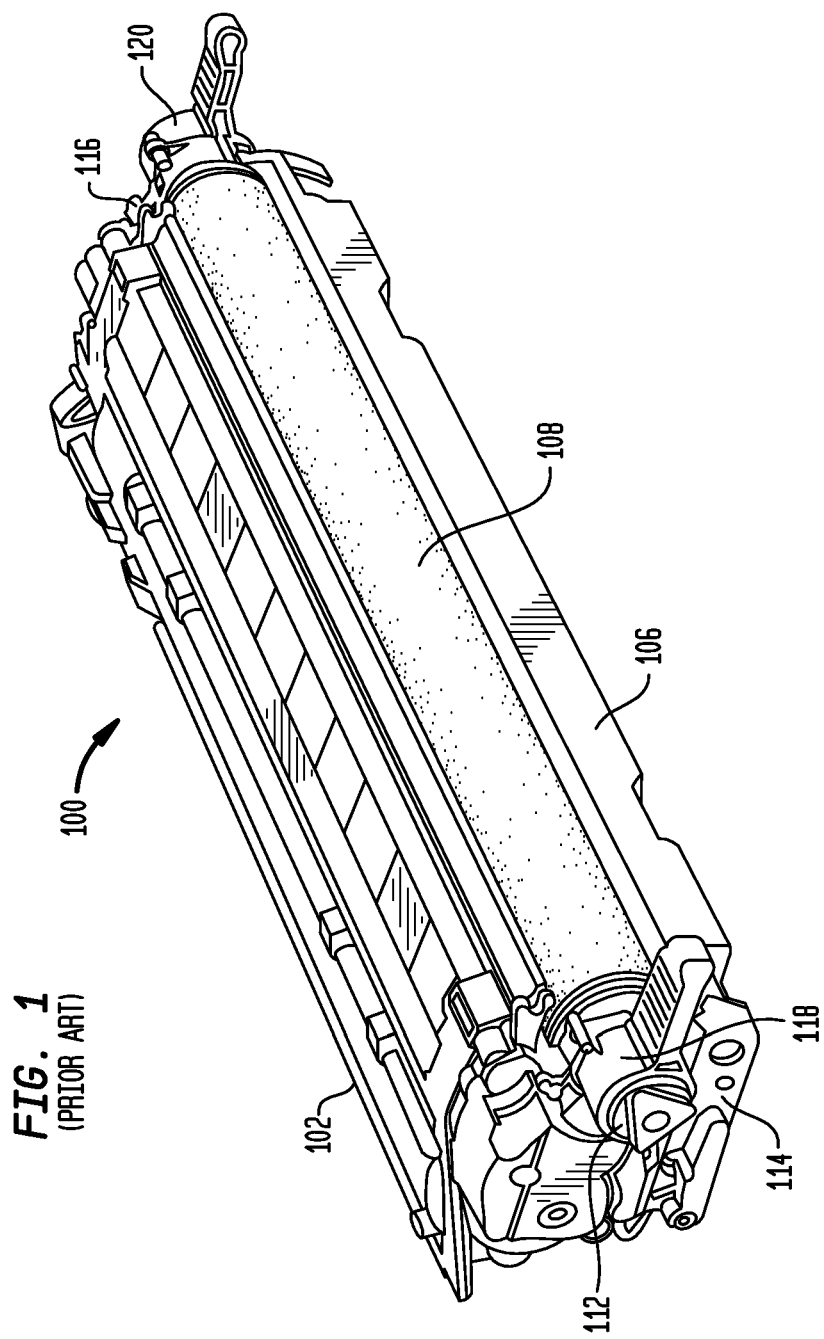
FIG. 1 illustrates a perspective view of the drive side end of a prior art toner cartridge.
Figure 2:
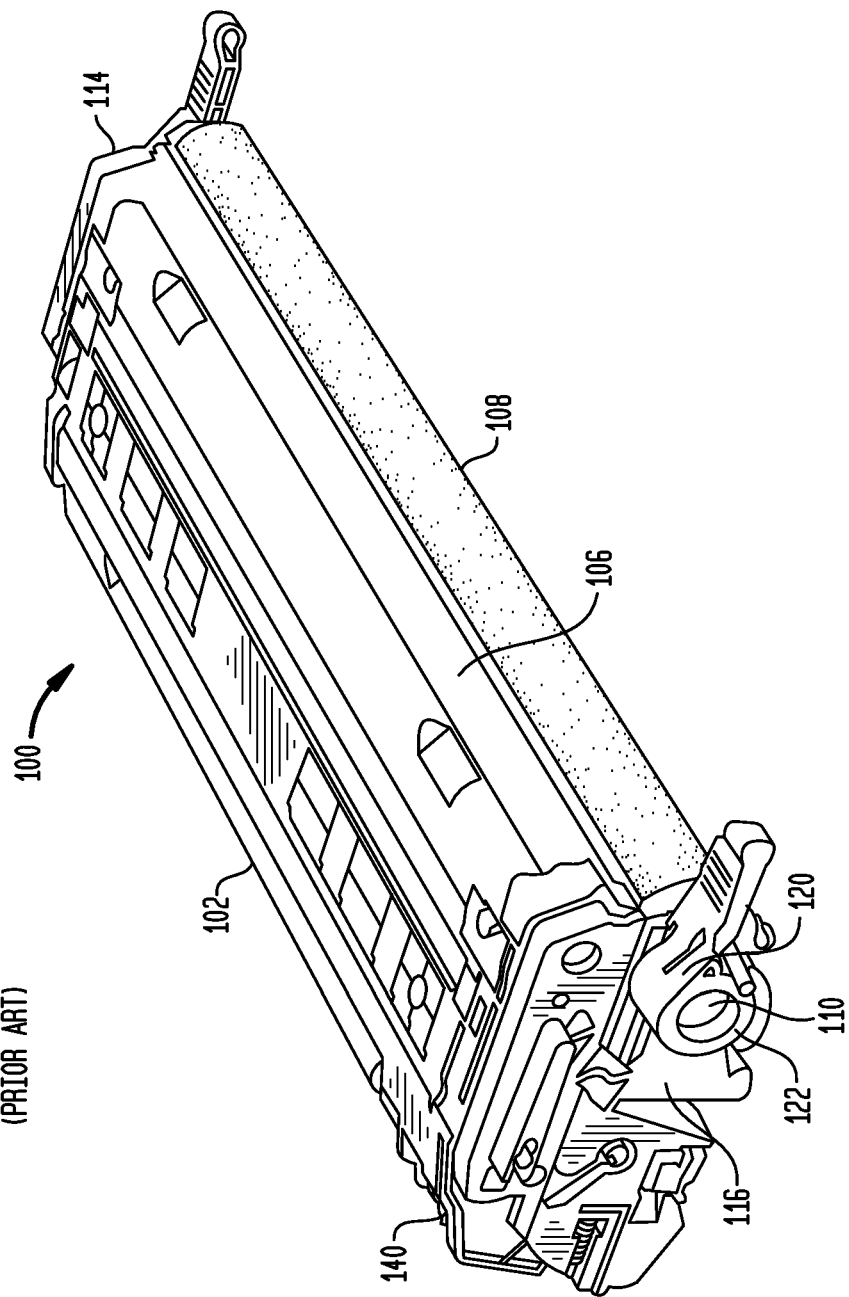
FIG. 2 illustrates a perspective view of the non-drive side end view of a prior art toner cartridge.
Figure 3:
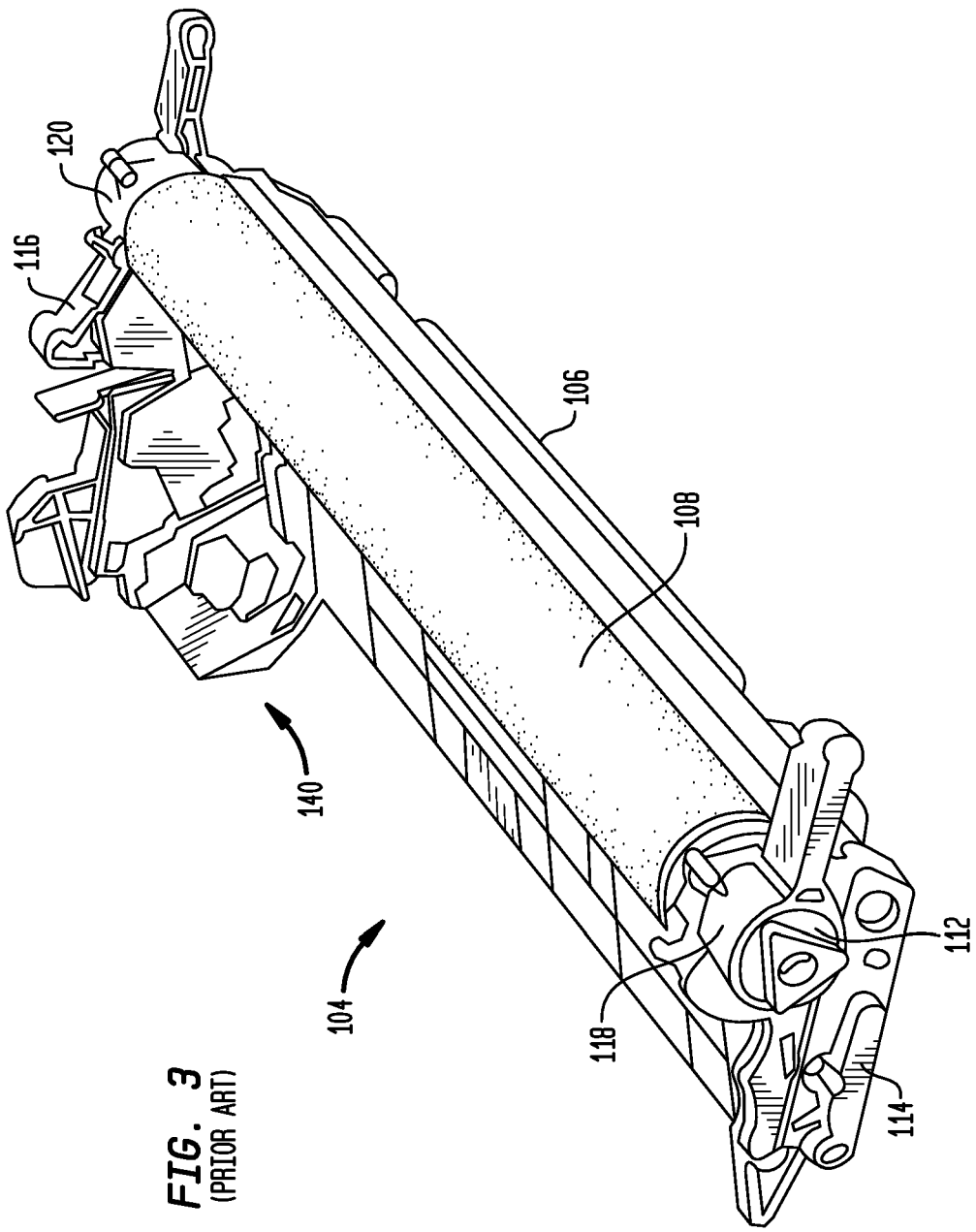
FIG. 3 illustrates a perspective view of a waste bin assembly.
Figure 4:
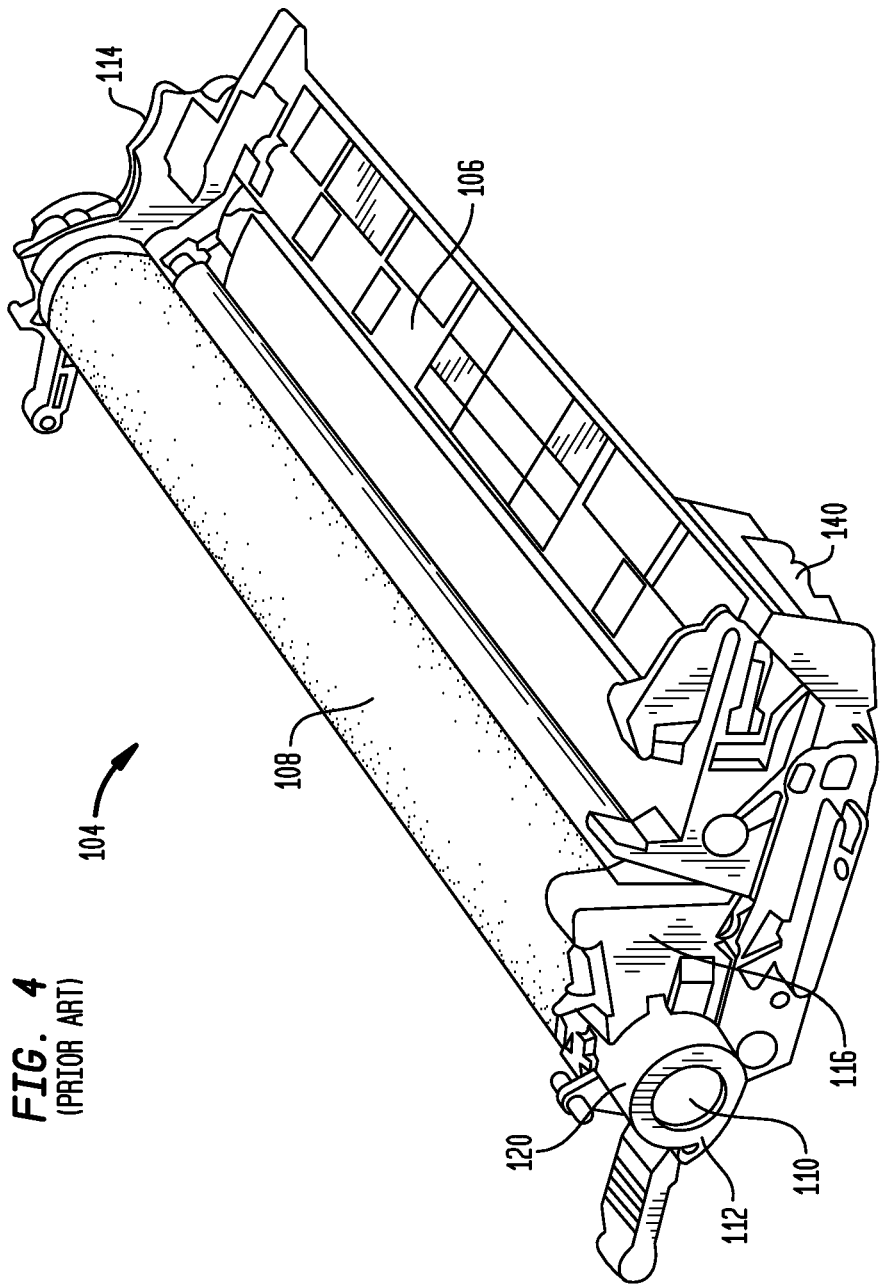
FIG. 4 illustrates a perspective view of a waste bin assembly.

FIGS. 1 and 2 show perspective views of a prior art toner cartridge 100. The toner cartridge 100 includes, among other components, a toner hopper assembly 102 and a waste bin assembly 104. FIGS. 3 and 4 show perspective views of the waste bin assembly 104 after separation from the toner cartridge 100. The waste bin assembly 104 includes a waste bin 106, an organic photo conductor (OPC) drum 108, and a chip holding structure 140, described in greater detail below. The OPC drum 108 comprises a cylindrical tube having first and second hubs 110 and 112, with each hub 110 and 112 extending from an end of the OPC drum 108. The OPC drum 108 is held in place by a drive side end cap 114 and a non-drive side end cap 116 which include OPC retaining members 118 and 120, respectively. The OPC retaining members 118 and 120 each include cylindrical openings which engage and hold the ends of the hubs 110 and 112 during the rotation of the OPC drum 108. The cylindrical opening of the OPC retaining member 120 is narrowed at the end by a flange 122.

Figure 5:
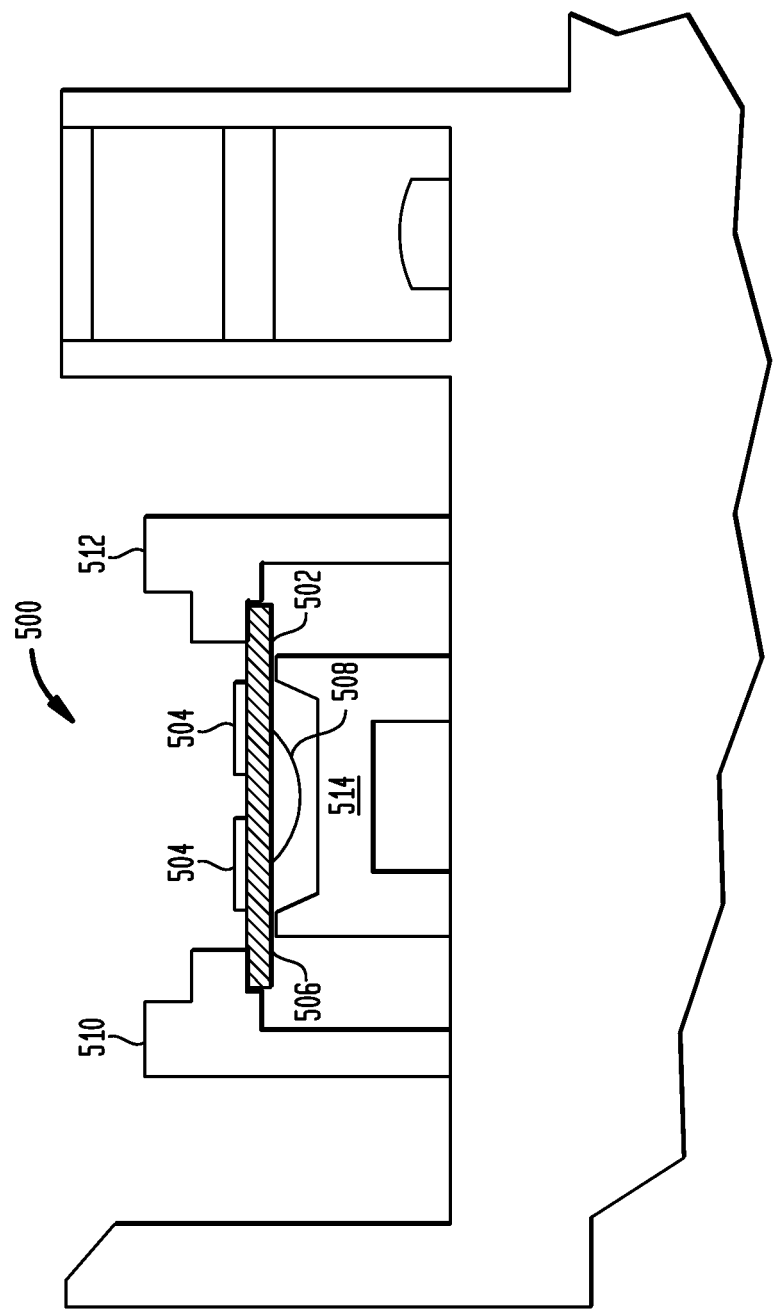
FIG. 5 illustrates a cross-sectional view of a chip holding structure of a prior art toner cartridge.

FIG. 5 shows a cross-sectional view of a chip holding structure 500 of a prior art toner cartridge holding an OEM chip 502. The OEM chip 502 may include electrical contacts 504 on one side of a printed circuit board (PCB) 506 for engagement with the printer and circuitry 508 including a memory element on the opposing side. Plastic flanges 510 and 512 hold the OEM chip from the top and the sides while support member 514 supports the bottom of the chip 502. The support member 514 and the flanges 510 and 512 form a slot in which the chip 502 is inserted for attachment to the toner cartridge.

The OEM chip 502 includes a memory element that stores data related to the toner cartridge. The data may include manufacturer date, manufacturer name, cartridge parameters, toner type, toner amount, and any other desired information. When the cartridge is initially inserted into the printer, the printer electronically communicates with the chip. The communication may be used to authenticate that the cartridge is a proper cartridge, i.e. a cartridge that is made by the OEM and designed to work with the particular printer. The printer may also read the data from the memory that is indicative of the toner parameters, including the toner load. The printer then calculates an expected page life for the cartridge, that is the number of pages that cartridge should be able to record without running out of toner. The printer can print a status page that indicates whether the cartridge is authorized for use and the expected page life of the cartridge.

The printer also uses the data in the memory to determine an amount of toner left in the cartridge. The printer includes a counter that counts the number of sheets recorded or the number of pixels recorded. When the number of sheets recorded approaches the expected page life for the cartridge the printer indicates that the toner is low. The printer may eventually determine that the cartridge should be out of toner and disables printing. Alternatively, the printer may include a toner a sensor, a light pipe, or some other mechanism for determining the actual level of toner remaining in the cartridge. This toner detector can be activated when the toner count approaches the expected page life of the cartridge.

While a toner cartridge has been described, the above situation is applicable to any type of printer. For example, an ink jet printer has an ink cartridge that includes an integral ink tank or an ink cartridge connected to a separate ink tank. The ink cartridge (or separate ink tank) includes a memory storing information such as the ink type, printer authentication data, and ink amount. This information is used to authenticate the ink cartridge and to determine a printing capacity for the ink cartridge.

Often, the OEM often does not fill the print cartridge with a maximum amount of recording material that the cartridge can hold. For example, in toner cartridges, often the capacity of the waste bin is lower than the capacity of the hopper. In order to ensure that the waste bin does not overflow, the OEM fills the hopper below capacity.

It is desirable to refill or remanufacture used print cartridges. Refilled print cartridges offer a more affordable replacement cartridge while maintain print quality and reduce waste. It is often possible to increase the print capacity of the refilled print cartridge. The page capacity can be increased by filling the print cartridge with more recording material (e.g. ink or toner) than the cartridge was initially filled with.

Another way to increase the print capacity of the print cartridge is to use a more efficient recording material may be used which allows the same amount of recording material to record additional pages. For example, toner has an efficiency rating that describes how much of the toner is used to record the image. The higher the efficiency rating the toner has the more images that can be recorded using the toner. Also, the higher the rating the less toner is wasted to be captured in the waste bin. In one embodiment, the toner cartridge is loaded with a toner having an efficiency of 75% or greater. In another embodiment the cartridge is loaded with a toner having an efficiency of 85% or greater. Conversely, if a the print cartridge is filled with a recording material that is less efficient than the original toner then print cartridge will have a reduced yield.

Figure 8B:
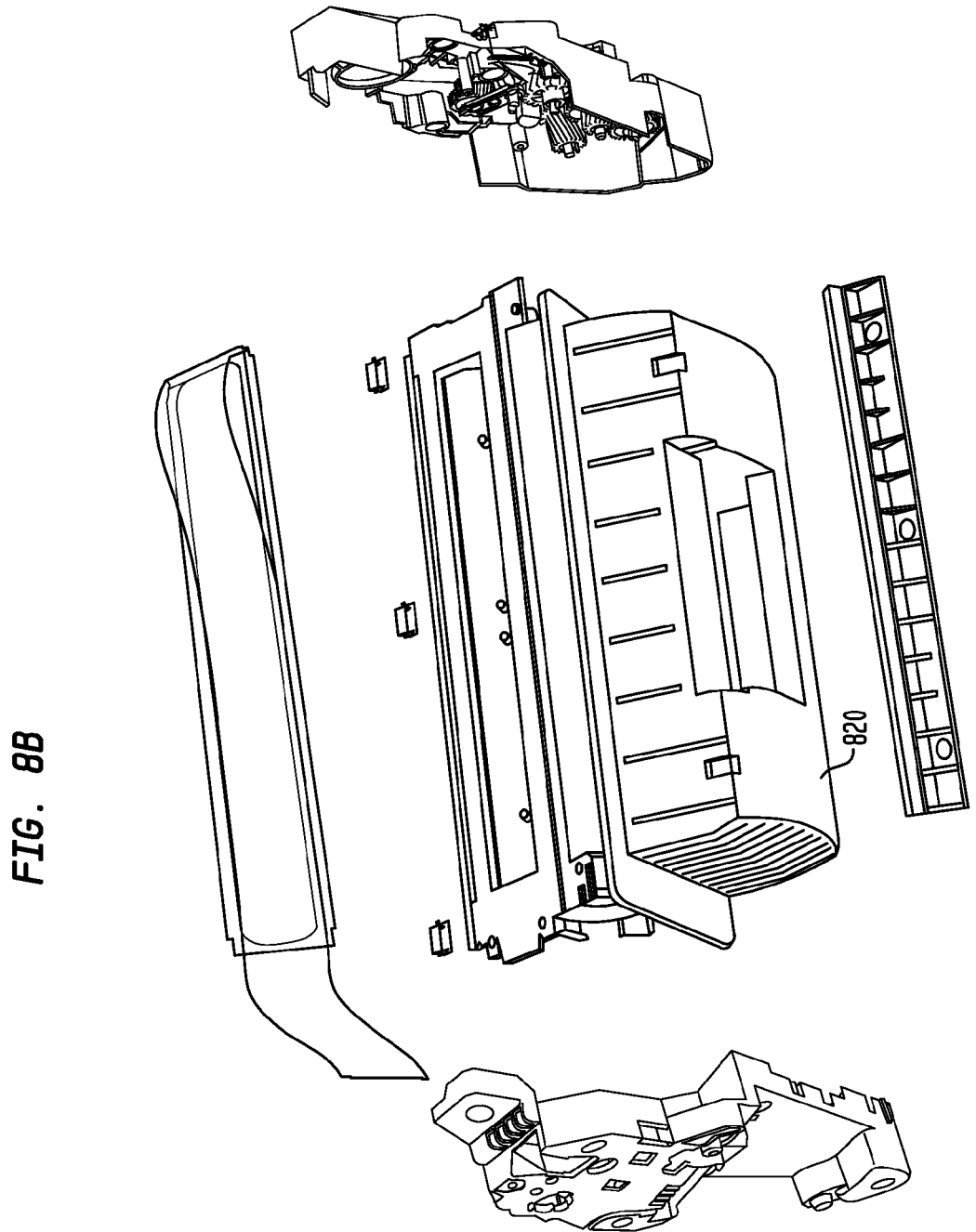

Another way to increase the print yield of a print cartridge is to enlarge components of the print cartridge. For example, in a toner cartridge the size of the waste bin can be increased to allow the waste bin to hold more toner. In any type of printer, the size of the recording material tank (e.g. ink tank or hopper) may be increased. A print cartridge having a standard yield with a standard hopper 810 is shown in FIG. 8*a* while an extended yield print cartridge having an enlarged hopper 820 is shown in FIG. 8*b*.

Another way to change the print yield of a print cartridge is to change the efficiency of its components. For example, in a toner cartridge changing the doctor blade, the doctor blade gap, the PCR, the developer roller, the OPC, the supply roller, or the toner, may improve the cartridge yield. In an ink jet printer, changing the nozzles, the ejector mechanism, the ink, or the ink tank, may change the cartridge yield.

Typically, the OEM writes information in the memory that prevents the cartridge from being reused after the cartridge is used. Thus, often a refilled print cartridge needs a replacement print chip in order to work properly. When the print cartridge has increased print capacity the memory must indicate this in order to ensure that print cartridge will work for its full life.

Figure 6:
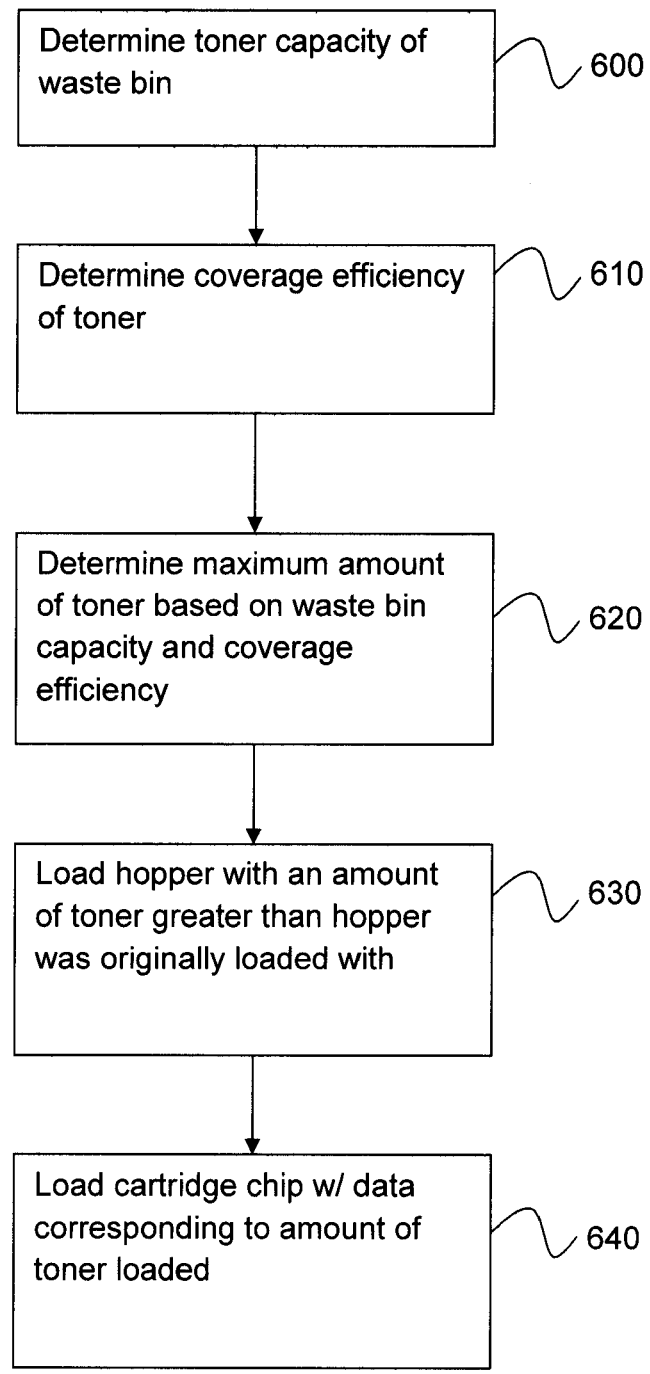
FIG. 6 illustrates a method of filling a toner cartridge.

FIG. 6 illustrates one method of refilling a toner cartridge. The method includes determining a storage capacity or limit of the waste bin 600. The coverage efficiency of the toner is determined 610. A maximum amount of toner that can be loaded into the toner hopper is determined based upon the waste bin capacity, the hopper capacity, and the efficiency of the toner 620. The toner hopper is loaded with an amount toner that is greater than the amount the cartridge was initially loaded with but not greater than the determined maximum amount of toner 630. The memory of the cartridge chip is loaded with data related to the amount of toner loaded in the cartridge. This method gives a toner cartridge having an increased print yield that will work properly in the OEM printer.

Figure 7:
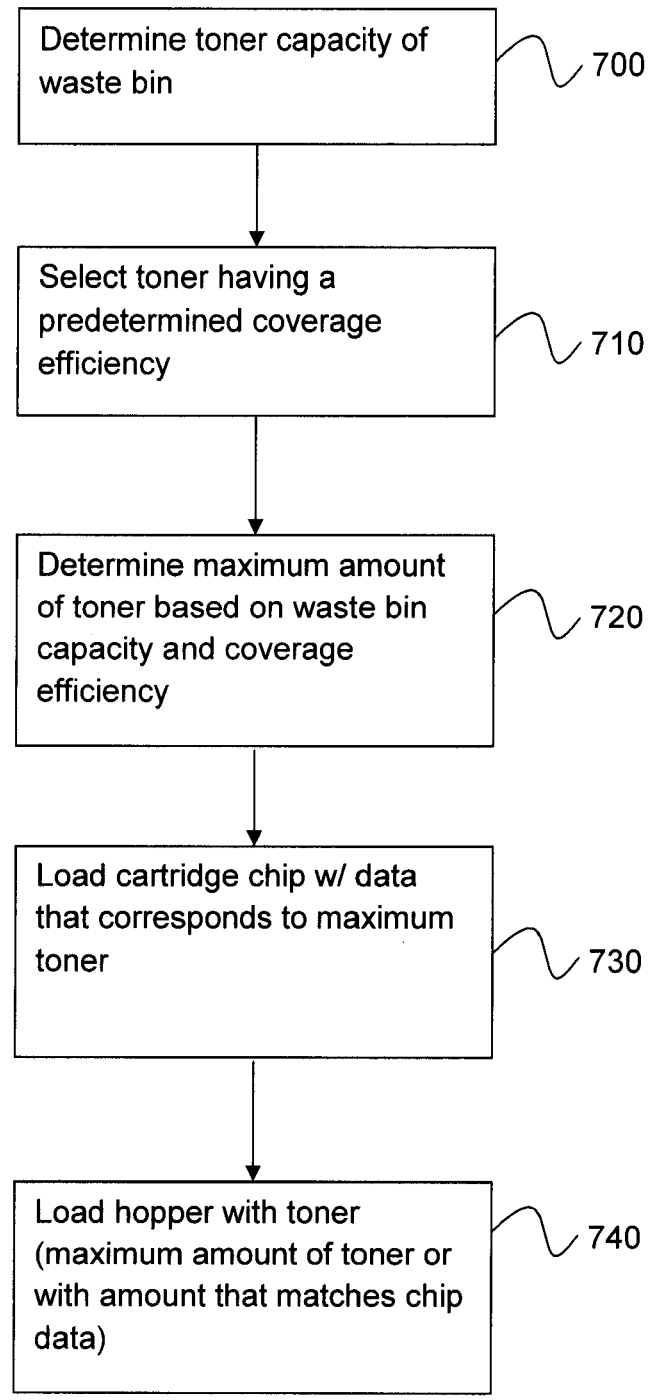
FIG. 7 illustrates another method of filling a toner cartridge.

FIG. 7 illustrates another method of refilling a toner cartridge. The method includes determining the toner capacity of waste bin 700. A toner having a predetermined coverage efficiency is selected 710. A maximum amount of toner based on waste bin capacity and coverage efficiency 720 is determined. The cartridge chip is loaded with data that corresponds to the determined maximum toner amount 730. The hopper is loaded with the maximum amount of toner 740. Alternatively the cartridge chip can be loaded with data that corresponds to a toner amount that is less than the maximum amount of toner and the hopper is loaded with an amount of toner that matches the data.

Using one of the methods above results a refilled toner cartridge. The toner cartridge has a waste bin having a toner capacity, and a hopper having a toner capacity. The hopper was initially loaded with a toner having a coverage efficiency. The cartridge has a cartridge chip including a memory for storing information indicative of an amount toner loaded in the hopper. The hopper has a greater toner capacity than the waste bin and the hopper is loaded with an amount of toner based upon the capacity of the waste bin and the toner coverage efficiency.

Another method for increasing the yield of a print cartridge will now be described. There is an expected life (or print yield) for a print cartridge based upon the amount of recording medium loaded into the cartridge. However, dependent upon various factors, the print cartridge may run out of recording material before or after the expected yield has been met. If the print cartridge runs out of recording material after the expected yield the cartridge is removed while still maintaining recording material. If the cartridge runs out of recording material before the expected yield, it is possible that the cartridge will stop printing in the middle of the print job. Also, in ink jet printers, it can damage the recording head to try and print when there is no ink available. Therefore, the OEM typically sets the data in the memory so that the toner or ink level will outlast the empty cartridge warning.

In order to increase the yield the cartridge, the data in cartridge chip memory can be set to more closely match the predicted yield of the print cartridge. Therefore, there will be less recording material remaining in the print cartridge when the printer indicates that the print cartridge is out of recording material.

The methods and apparatuses described above may also be used in managed print system (MPS). A managed print system is a system where all of the devices of an entity are monitored and maintained by a single party. Typically, a third party vendor or information technology person uses software to monitor a network of devices, including printers, copiers, scanners, facsimile machines, and scanners. The MPS can route jobs and results throughout the network to ensure the most efficient use of resources. The MPS also monitors the status of equipment and maintains the equipment. For example, the MPS provider is able to monitor the remaining life in print cartridges, paper use, and other maintenance related information.

The MPS uses software to manage the network of peripheral devices. The MPS can operate the printers and direct the printer to look for a code stored in the memory of the cartridge chip. This allows for the memory of a replacement chip to contain additional information than the OEM chip, without inhibiting the operation of the chip. When the code is detected, the MPS provider determines that the printer is loaded with a high yield cartridge. The MPS system is able to accurately track the amount of recording material left in the cartridge and order a replacement cartridge at the proper time. The MPS can either update the individual printers with the accurate information or allow the individual printers to have inaccurate status information.

Figure 9:
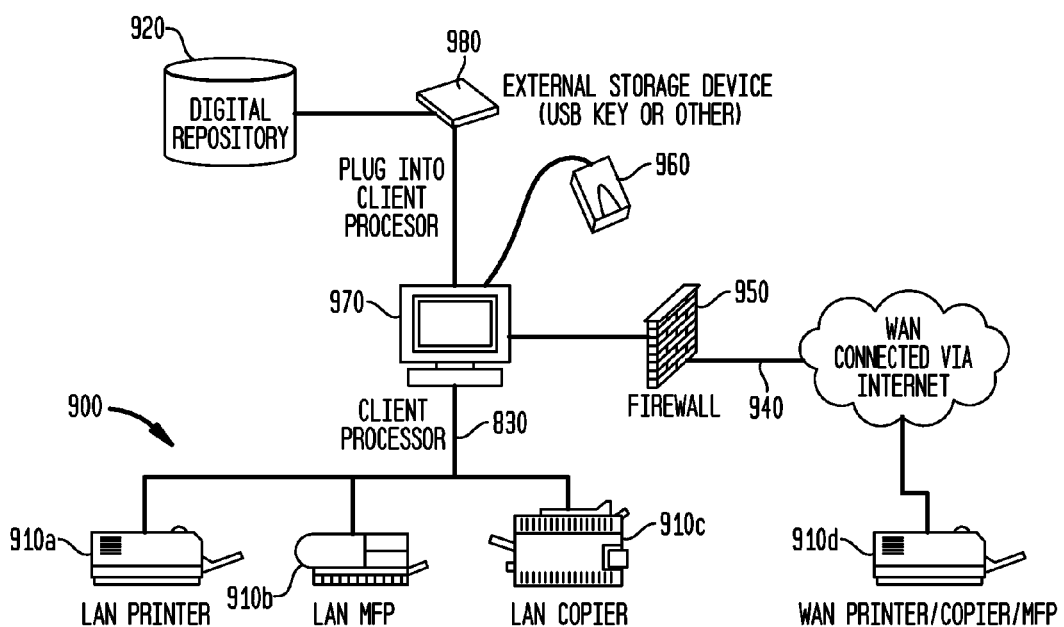
FIG. 9 illustrates a conventional managed print system.

FIG. 9 illustrates a prior art simplified print network such as an MPS system. A local network 900 includes several printing devices 910a, 910b, 910c, 910d that are each provided with a diagnostic unit for collecting data. A local processor 920 connected to the local network 900 via a wired or wireless connection 930 as well as partly via an internet connection 940 with a firewall 950.

While it is described that each of the printing devices is provided with a diagnostic unit, it is not necessary for each printer to have a diagnostic device. In this case, the computer controlling the use of the printing device can be used as diagnostic unit for some data. Also, a virtual printer or print spooling device may be connected to the printer to be used for the diagnostic. The virtual printer device may be a physical device or may be software provide in the computer or via the network. The virtual printer communicates with the printer and with one or more device that is connected to the printer.

The local processor can be one specific computer managed by one specific person or group of people, or can be a central computer or a server.

In this illustration, the local processor is a specific computer 970. The computer may include software that contains specific instructions for collecting, at least periodically, data from the printing devices 910a-d and for storing said data on an external and removable data storage device, such as a USB flash drive, USB key, or other storage device provided with a USB port for connecting the storage device with the USB port of the local computer 970. Alternatively, the computer may communicate via the internet connection 940 to an outside device or network the stores the data.

The storage device 980 connected to the local computer 970 may include instructions readable by the computer 970, so as to enable the local processor to execute a program or software when encoding or storing the data from the various printing devices, but also for processing the data so as to edit another or an amended file memory, memory including advantageously at least a part of the history of the file, such as status monitoring report with its history.

When the storage device is provided with the latest data from the printing device, said data can be processed by a computer, for example a computer of the local network, a personal computer possibly adapted for being connected to the local network, a remote computer, for example a computer receiving the data via internet, etc. Alternatively, this processing occurs at the outside device or network when a storage device is not used.

When the processing is carried out in a computer connected to the local network, the data and processed data of the printing devices are advantageously placed in a storage device accessible via the local network to one or more authorized people.

When the processing of the data is carried out in a computer not part of the local network, the storage device 980 can be used by a provider of materials for analyzing said data in his computer or in a remote network for analyzing steps to be carried out. The data of the storage device can also be sent to the external computer by internet.

An improved method for using the system of FIG. 9 is described below. An authorized person or group of people of the client for the local network or an authorized person or group of people for the maintenance of the client's printing device plugs into the client processor 970 a USB key 980. The client processor reads the content of said USB key 980, so as to initiate a program for searching data from the various printing devices of the local networks. The printing devices each have a diagnostic unit which can be queried or questioned via the local network for obtaining at least some data there from. Alternatively, each printing device communicates to a single device that performs the diagnostics. Additionally, the program can search some data relating to the local network as such, for example the location of the printing devices in the local network, the computers of the local network having access to said printing devices.

The contents of the external storage device are accessed via a client processor so as to initiate the program or software contained in the external storage device or so as to initiate an internet communication for connecting a local processor to an external processor with a collecting program or software. For having the access to the content of the external storage device, the introduction of one or more passwords is required. The client processor initiates now the information collection system.

The external storage device may contain security features to protect access to the data, such as requiring submission of a username and password. The security features may include one or more biometric security devices, such as a fingerprint scanner 960, that is connected directly to a computer port, such as part of a USB device, or is integrated into another electronic device, such as the external storage device 980. Security may also be enhanced by encrypting communications between various electronic devices, particularly communications that are transmitted over a network, by encryption software stored on the external storage device 980 and executed on the processor 970, with encryption hardware (not shown), or both.

One problem associated with the MPS system described above is that the system is dependent upon the printer firmware loaded in the printer. Often times, the printer firmware communicates with a chip located on the print cartridge. This communication may serve many functions. Initially, the cartridge chip may communicate authentication information to the printer that verifies that the print cartridge is proper for use in the printer. The cartridge chip also may include stored data. This data may include information such as cartridge manufacturing date, cartridge configuration, and print material load.

In many printers, during normal operation the printer initially communicates with a newly installed cartridge to confirm that the cartridge is authorized for use in the printer. After authentication is completed, the printer monitors the print job and calculates the amount of pixels printed during the print job. The pixel count is then stored in memory on the cartridge chip. When a predetermined pixel count is reached, the printer displays a toner low, or ink low warning. This warning prompts the user to replace the cartridge. The user then contacts the MPS provider for a new print cartridge and the new print cartridge is installed into the printer.

Figure 10:
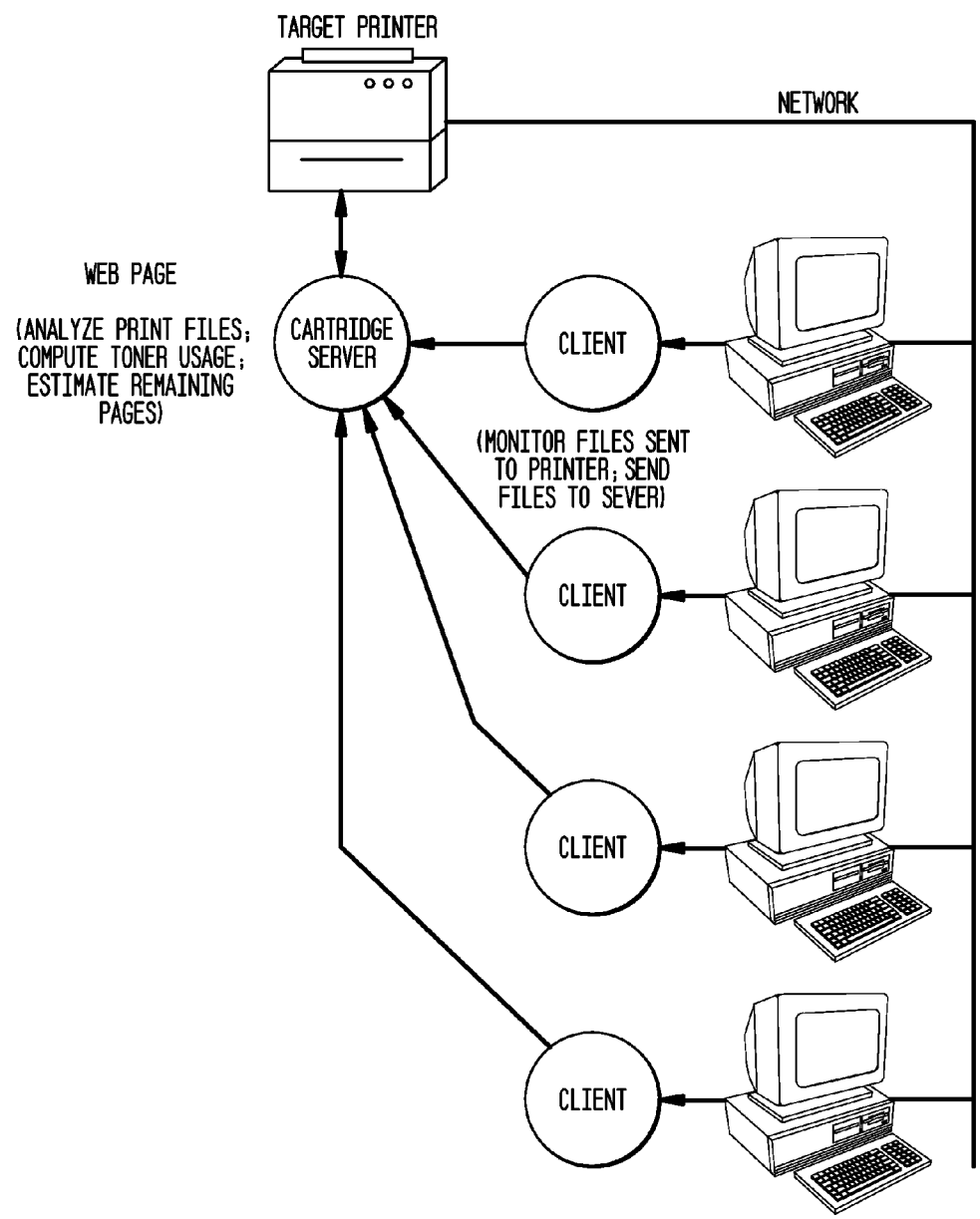
FIG. 10 illustrates a system for monitoring a printing device.

FIG. 10 illustrates a system that monitors one or more printers connected to a network. A printing device 1010 is connected to one or more processors 1020 through a server 1040. The server 1040 may be a MPS server or a virtual printer. Each of the processors 1020 has software installed 1030 that acts as client software. The client software sends all print data to the server 1040. The server 1040 identifies the cartridge type for each printing device 1010 that is connected to the network. The server 1040 analyzes the print data received from the client software 1030 and converts the print data into pixel format and computes consumable useage based on identification criteria and the pixel count. The server 1040 is connected to an outside source, such as a web page, for monitoring of useage information and to enable updates to the server 1040. The server 1040, may contain a universal print driver or may convert the print jobs into .pdf format in order to simplify operation.

The system of FIG. 10 may use various protocols to "marry" the print cartridge to the MPS system, i.e. prevent the print cartridge from working outside of the MPS environment. For example, a typical printing device will reset upon receiving a reset command. The server 1040 may issue a reset command causing the printing device 1010 to turn off and reset. The printing device reads a cartridge serial number on the cartridge chip prior to performing other functions. Typically, the serial number is examined by the printing device whenever a cartridge is installed, the power is turned on, or a reset command is received.

In one embodiment, the system is configured so that the cartridge chip prevents full access to the printing device until a specific number of serial number reads occur which indicates that a specific number print device reset cycles have occurred. When the first serial number read is detected by the cartridge chip, the chip is set, by the MPS system, to require a specific number of serial number reads to occur to activate the chip. The MPS system tracks the number of reset commands sent the printing device, and sends reset commands to the printing device until the specific number of serial number reads has been met. Alternatively, the specific number of serial number reads can be altered for each cycle. If a print cartridge is removed from the printing device connected to the MPS system, the print chip will not install because the specific number of serial number reads will not occur.

FIG. 11 illustrates an example of data that is stored in the cartridge and that can be read by the printer. For example, an HP02® cartridge has a chip having a memory that stores data read by the printer. The table below describes some of the information stored for some addresses.

| Address | Function |
| --- | --- |
| 00 | Device ID. |
| 01 | Color ID. |
| 02 | Additional Color ID. |
| 07 | Cartridge Region. |
| 0A | Indicates Starter or Non-Starter Cartridge. |
| 03, 04, 0B, 18, 1C, 22, 26, 2D, 58, 5E, 66, 78 | Data that cannot be changed. Printer reports and error |
| 0C-12, 21 | Can be changed, but printer reports "Non-genuine cartridge" |
| 20, 28, 2A, 2B, 2E, 2F, 5C, 79 | Can be changed to 00. Printer reports "Genuine HP" |
| 19 to 1B | Install and Manufacturing Dates. |
| 1D to 1F | Cartridge Serial Number |
| 23, 24 | Cartridge Original Volume |
| 25 | Cartridge Expiration Date |
| 27 | Additional Ink Cartridge Color ID. |

The cartridge identification can be data stored in the printer. Some of the data in the memory is read by the printer and affects the performance of the printer. Other data, such as the data in addresses 20, 28, 2A, 2B, 2E, 2F, 5C, 79, stored in the printer does not affect of the performance of the printer. The cartridge identification is data that is different than the original data from an OEM cartridge. Therefore, preferably the cartridge identification should be stored in area that does not affect the printer performance. For example, the cartridge identification can be stored in address 1D to 1F as a unique serial number (i.e. different than the OEM serial number) that is recognized by the MPS system or virtual printer. Alternatively, another area of the memory may be loaded with data that is identified as the cartridge identification. For example, the expiration date could be a date far in the future or past, such as Dec. 1, 3060, that is recognized as the cartridge identification. Any of the fields read by the printer may contain data that works as the identification. Alternatively, an address that is typically 00 or FF that is not read by the printer can be used to store the cartridge identifier. The MPS or virtual printer can cause the printer to read an address that is normally ignored.

If the printer cartridge installed in the printer is a remanufactured print cartridge, the printer may issue a low toner (or ink) warning prematurely. For example, if the print cartridge is an extended yield remanufactured toner cartridge, the printer may display low toner after printing 4000 pages. However, the remanufactured toner cartridge may be able to print 6000 pages before running into a toner low situation. In this example, a toner cartridge is removed with 2000 pages of print life remaining. This results in a more frequent cartridge replacement, cartridge refilling, and wasted toner.

The current system enables the MPS to more accurately calculate or predict the end-of-life of the print cartridge. As described above, the cartridge chip includes an identification code that can be read by MPS or the virtual printer. The cartridge code identifies the cartridge to the MPS system. The MPS system then can determine the cartridge characteristics. These characteristics may include cartridge size, toner load, ink load, manufacturer identification, manufacturing date, remanufacturer identification, remanufacturer date, toner characteristics, ink characteristics, expected cartridge yield, and other desirable information.

The identification code may be data stored in the memory, a bar code or other machine readable information, a RFID tag, a user input, or any other suitable means for identifying a cartridge. Also, an identification code can be associated with print cartridges that do not include a cartridge chip or a memory. An identification code can placed on the print cartridge where it fits and communicate wirelessly with the MPS or virtual printer.

The MPS or virtual printer is used to monitor communications between the processor and the printer or imaging device. The communications are used to determine details about the print job such as the number of pages printed and the density of the image printed. The virtual printer then calculates a number of pixels printed based upon the print job information. The virtual printer can store this information, either on the external storage device 880, or send this information to the MPS provider. The virtual printer repeats these steps each time the printer is used for printing and a total number of pixels printed by the printer is calculated. When the printer prints a total number of pixels printed that matches a threshold yield expectancy of the print cartridge, the processor 870 sends a message to the MPS provider to provide a replacement cartridge as well as to the print user to order a replacement cartridge.

Another advantage of the system is that the any information can be associated with cartridge identification. This enables the system to determine toner or ink use with a much higher precision. For instance, an electrostatic printer in a climate controlled office will print a document with a certain milligrams of toner per page. For example, a printer in an office may print a text document with an average of 9 mg of toner per page. However, the same printer located in a warehouse or manufacturing facility that is higher and more humid will use more toner. Furthermore, if the same printer is used for printing graphics it will use a third amount of toner per page. The same examples hold true for an inkjet printer.

The current system allows the usage and environmental information of the printer or cartridge to be used to determine a more accurate ink or toner count. For example, if a printer is located in a warehouse in south Florida, the system adjusts the toner count to account for the high heat and high humidity conditions.

Another advantage of the current system is that enables more efficient use of network resources. In many corporate environments, there are one or more print rooms that hold multiple printing devices. Typically a user sends documents to the same printer either for convenience or habit. The present system allows for the virtual printer to select the best printer for the print job.

For example, user A needs to print a five hundred page text document. User A selects print and sends the print job to the virtual network printer. The virtual network printer then monitors the printers that user A is able to print to. The virtual printer selects a printer that is most efficient for printing text documents and that has enough toner or ink in the cartridge to print the entire document. When the print job is completed, the virtual printer displays on user A's monitor that the print job is completed with the location of the print job.

In another example, user A prints a large monochrome text document and a presentation containing multicolored graphics. The virtual printer may select two different printers to print user A's documents, a printer that is most efficient for monochrome text and a multicolor graphics printer. The virtual printer then displays on user A's monitor the location of the print jobs.

Alternatively, the system may spool print jobs to printers to optimize the performance of the printer. For example, in laser printers it is more efficient to print pages continuously than it is to print a page, wait a short period of time and then print another page. The virtual printer can monitor print jobs and send jobs to a printer to enable the printer to print pages continuously. This prevents extra wear on the individual printer.

Another example of the system is the reduction in cost to the MPS provider. Typically, and MPS provider estimates the cost of printing a page. This estimate is based on the average print job for a customer. Then MPS provider then charges its customers this calculated cost per page plus some surcharge. The surcharge is the MPS provider's profit. The current system allows the MPS provider to reduce the cost per page by enabling print cartridges to be used closer to an actual end-of-life. Additionally, the current system allow the MPS provider to better calculate the amount of toner used per page and type of toner used per page. This allows for the MPS provider to determine more accurately the cost of each page. This in turn allows the MPS provider to reduce the cost charged to the customer. Furthermore, this system even allows for the MPS provider to charge on a per toner system instead of per page model.

In another embodiment, the presence of identification allows the virtual printer or the MPS system to reset the printer at some point in the life of the cartridge. In many printers, when the pixel count reaches a predetermined threshold level, the print cartridge is considered to be emptied and the printer will no longer allow the print cartridge to be used for printing. This type of system prevents an extended yield remanufactured print cartridge from being used for its full print life. A method of alleviating this problem will be described below.

An extend life (or high yield) remanufactured print cartridge is loaded into a printer. The cartridge chip communicates with the printer to authenticate if necessary. The virtual printer reads the cartridge chip identification and determines an expected print life for the print cartridge. The virtual printer monitors the communication with the printer as described above to determine an accurate pixel count, toner amount used, or ink used. The printer eventually disables printing with the print cartridge after printer determines that the print cartridge has printed the number of pages or pixels that a standard print cartridge should print. The virtual printer receives the printer out status and determines that the printer cartridge is an extended life cartridge and still has printing material therein. The virtual printer sends a signal to the cartridge chip telling the chip to reset to a chip that has printing material therein. The virtual printer then causes the printer to reset, or power off and back on, to reread the cartridge chip. The printer reads that the cartridge chip still contains printing material an allows printing to continue.

In an alternative, the virtual printer requests that the user power off the printer and power back on or open and close the printer cover. This allows for the user to cause the printer to authenticate the chip if the virtual printer is not able to force the printer to restart. Alternatively, the virtual printer could request user intervention if the automatic restart did not properly reset the printer.

Another advantage of the current system is that allows for custom messages to be provided to the user. Many conventional printers communicate ink or toner levels to a user via messages displayed on a computer monitor. The printer sends signals to the connected processor to display information such as "toner low", "ink low", or "replace cartridge." Also, messages that provide ordering information such as cartridge type may be displayed or the computer may take the user to an internet website to order a new cartridge. The current system enables custom information to be displayed to the user. This may include all of the information that a typical printer may display. The printer may also provide additional information such as total pages printed, monthly expenses, cartridge remanufacturer, or any other desirable message.

One way printers communicate information to the user is via a screen or display located on the printer. For examples many printers have a display located on the printer. The display can convey information about the printer's status, the print job, an out of paper indicator, an out of ink or toner indicator, or any other desirable information. A second way printers communicate information to the user is via a monitor connected to the user's computer. For example, a printer sends information to the user's computer. The computer then causes a connected monitor to display. A third way printers communicate information to the user is by printing information onto a recording medium. For example, some printers print a status supply page automatically when a new cartridge is loaded into the printer or when the ink or toner level in the cartridge reaches a predetermined low level. The status supply page conveys information such as the cartridge model number, the number of pages the cartridge is capable of printing.

Printers use internal programming to control the operation of the printer, the communication between the printer and connected devices, the display of information on the printer's display, and the printing of a supply status page. In many conventional printers, the internal programming can be written in or changed using standardized programming languages such as printer control language (PCL) or printer job language (PJL). Some printers use PJL to enable the switching of printer languages at the job level, and to enable status feedback between the printer and a computer or processor. Hewlett Packard® developed PJL and describes its use in *Printer Job Language Technical Reference Manual*, which is incorporated by reference. Using PJL, users can develop applications that are capable of switching printer languages, monitoring printer status, requesting information such as the printer model and configuration, changing control panel default settings, modifying control panel messages, and other desired modifications to the printer.

The current system can use applications written in PJL to control the information displayed by the printer. For example, a printer has a printer cartridge loaded therein, the printer cartridge having an identification associated therewith. The cartridge identification indicates to the virtual printer or MPS system characteristics about the cartridge such as its expected page yield, the remanufacturer of the print cartridge, and a website URL with information to order a replacement cartridge. An application written in PJL is stored on the processor, stored on the peripheral device, or stored on a network. The application is used to communicate with the printer to change the supply status page that printer will print. The printer prints a supply status page indicating the expected page yield for the particular cartridge, the company that supplied the cartridge or remanufactured the cartridge, and information to order a cartridge from the supplier, all based upon the cartridge identification.

Additionally, the stored application, or an additional application, can use PCL or PJL to control the information the printer communicates to the use via the connected processor and its display. For example, a printer has a printer cartridge loaded therein, the printer cartridge having an identification associated therewith. The cartridge identification indicates to the virtual printer or MPS system characteristics about the cartridge such as its expected page yield, the remanufacturer of the print cartridge, and a website URL with information to order a replacement cartridge. An application written in PJL is stored on the processor, stored on the peripheral device, or stored on a network. The application is used to communicate with the printer to change the information the printer conveys to the connected processor. This new conveyed information causes the processor to display on the user's monitor information indicating the expected yield for the particular cartridge, a remaining amount of printing material, the company that supplied the cartridge or remanufactured the cartridge, information to order a cartridge from the supplier, and a webpage link to order a new cartridge, all based upon the cartridge identification.

In the above examples, any desired information can be printed on the supply status page or displayed a monitor. Additional forms of communication can be used. For example, the printer can cause the processor to send an e-mail or play an audio signal conveying desired information.

In other embodiment, the cartridge chip includes a communication device. The communication device may be a Bluetooth device, a wireless internet card, RFID, or any other way to communicate electronic information. In this embodiment, the wireless communication device communicates directly to the virtual printer or MPS system. Alternatively, the wireless device may communicate directly to an off-site system.

The communication device allows for the virtual printer to communicate with the cartridge chip. The cartridge chip may communicate the information that is normally passed only between the cartridge chip and the print driver. This enables the virtual printer to monitor the chip directly, without having to monitor the communications between the processor and the printer. Using the communication device, the chip tells the virtual printer its updated status and an accurate pixel count, toner count, ink count, or page count can all be calculated.

Additionally, the communication device may enable the cartridge chip to be reset. This would enable a cartridge chip to be reset without having to return the chip manufacturer.

Another advantage of the current system is that the system can be used to customize the operation of the printer device. In conventional printers, the printer is a closed system and the internal printer firmware controls the operation of the printing device. The firmware that is loaded in the printer controls the functioning of the printer and performs the recording material usage calculations. A user is limited in the ability to control how the printer operates. Typically, a user is limited to controlling the image quality using options such as draft, normal, fine, photograph, etc. Also, the user can typically select the media type, such as, plain paper, photo paper, specialty paper, etc.

An advantage of the current system is that the peripheral device can communicate with the printer and change the way the printer operates.

For example, printer companies often update the firmware used in the printer to address problems that have been discovered in the printer's operation or to address changes implemented in new cartridges. Sometimes the updated firmware may cause other errors or cause certain cartridges to not function properly.

The current system allows for correction of errors caused by the firmware. In some instances, the printer's firmware revision is accessible by the peripheral device. The peripheral device can compare the firmware revision with the characteristics of the cartridge loaded in the printer. The peripheral device can perform alternative printer control functions or provide printer information based on the firmware revision in order to optimize the printing or to correct errors.

For example, it may be known that a particular firmware revision reports erroneous cartridge yield information. The peripheral device can correct the erroneous information and provide the correct information. If the identified cartridge characteristics require different printer operation, then the peripheral device can alter the operation.

In another embodiment, the system can be used to update the printer's firmware. In many printers, the printer prompts the user through an interface that a newer version of firmware is available. If the user accepts the new firmware, the printer gets the newer version of the firmware via an internet connection and updates the printer with the new firmware. The current system allows for the peripheral device to indicate to the use that new firmware is available. When the user accepts the newer firmware, the peripheral device obtains the firmware from the MPS provider and updates the printer's firmware. Alternatively, the firmware update may be performed automatically or by a MPS representative servicing the printer.

In another embodiment, the peripheral device can change the calibration of the printer to improve the performance and print quality of the printer. Printers are calibrated to work with OEM cartridges. The OEM is in control of the characteristics of the cartridge and sets the printer to work with the cartridge in the typical print environment. Changes in the print cartridge, other internal printer elements, or the printer use can affect the printer operation.

For example, a system includes a laser printer connected to a personal computer and a peripheral device. The user installs an aftermarket toner cartridge having a cartridge identification. The toner cartridge has be remanufactured and filled with additional toner to increase the print yield of the cartridge. Also, the toner has different characteristics than the OEM toner.

The peripheral device knows the characteristics of the cartridge by the cartridge identification. The peripheral device changes the algorithm that the printer uses to calculate print yield to match the increased print yield of the remanufactured toner cartridge. Also, the peripheral device changes the operating voltage of the printer to match the characteristics of the aftermarket toner. This can be increased voltage level or a decreased voltage. These changes allow the printer to print high quality images using the aftermarket toner cartridge.

The peripheral and cartridge identification allow printer optimization for an internal printer part. The identification is not limited to a cartridge identification providing information about the print cartridge. An identification can be used to determine any desired characteristics of the printer and its internal parts, the print cartridge and its parts, the recording medium, the environment where the printer is located, or the user of the printer.

For example, laser printers have many parts than can affect the image quality and operating characteristics. These may include the OPC drum, a PCR roller, the power supply, the toner, the doctor blade, and the recording medium. The identification can be used to identify any or all of these parts. Furthermore, a system can use multiple identifications.

For example, a system may include a cartridge having a cartridge identification and a user identification. The cartridge identification is used to determine the cartridge characteristics while the user identification is used to determine user characteristics. User characteristics may include typical usage, documents typically printed, environments where printers are located, typically maintenance scheduled used on printers, and type of recording material used to print.

Although the systems and methods above describe a virtual printer or a MPS system, the invention is not limited to using either one. The system could be implemented using software loaded onto the network server, software loaded onto the individual processors, or a remotely located system that is remotely contacted via the internet or telecommunications lines. Furthermore, the system and method can be implemented on a single imaging device connected to a single processor, or single imaging device connected to a home network. Additionally, the system is useful with any type of imaging device that is connected to a processor. This includes inkjet printers, electrostatic printers, facsimile machines, digital copiers, printing devices that print three-dimensional models, and all-in-one machines.

In one embodiment, the system and method are implemented using simple network management protocol (SNMP) and a management information base (MIB) database. Many printing devices use SNMP to enable communication management data about the printing device. The management data is stored as variables which describe the printer configuration. The managing application, or server, can query the variables to determine information about the printing device. Typical information stored as variables include: printer type, printer on time, number of internet protocol packets sent or received, printer serial number, consumable serial, manufacture date, etc. Any desirable information can be included and the information can include a thousands of different variables.

The printing device includes firmware which is used to communicate with and manage the SNMP. The printer firmware may include all or a subset of the SNMP information and may respond to all or a subset of SNMP requests. The firmware may include standard SNMP definitions, i.e. SNMP definitions that are standard across different printing device models, and custom SNMP definitions that are a set by a custom MIB. A MIB is a database that is used to define and describe the variables for a printing device that support the NMP. The MIB consists of many entries which may be similar to the example entry below.

Name:consumable-status-first-install-date
Type: OBJECT-TYPE
OID: 1.3.6.1.4.1.11.2.3.9.4.2.1.4.1.10.1.1.8
Full path:
  iso(1).org(3).dod(6).internet(1).private(4).enterprises
  (1).hp(11).nm(2).hpsystem(3).net-peripheral(9)
  .netdm(4).dm(2).device(1).destination-subsystem(4)
  .print-engine(1).consumables(10).consumables-1(1)
  .consumable-status(1).consumable-status-first-
  install-date(8)
Module: LJ9000mfp-MIB
Parent: consumable-status
Prev sibling: consumable-status-info
Next sibling: consumable-status-last-use-date
Numerical syntax: Octets
Base syntax: OCTET STRING
Composed syntax: DisplayString
Status: optional
Max access: read-only
Size list: 1: 0 . . . 24
Description: This object is used to report the date on which this consumable was first installed. The format of the string is 'YYYYMMDD'. Where:
  YYYY is the year.
  MM is the month (1-12).
  DD is the day (1-31).
The device POS needs to indicate what will be written in the event the printer does not have a real time clock.
Additional information:
This object will only exist for Authentic OEM consumables.
If the cartridge is deemed to be Non-OEM, then this object will not exist. For printers without internal clocks, the date will always be 20000101.

Using the definitions provided in the MIB database, a SNMP "walk" through the MIB is performed to identify each returned piece of information from the MIB. An example of SNMP querying the MIB is below.

587: prtMarkerSuppliesClass.1.1 (integer) supplyThatIsConsumed(3)
588: prtMarkerSuppliesClass.1.2 (integer) supplyThatIsConsumed(3)
589: prtMarkerSuppliesClass.1.3 (integer) supplyThatIsConsumed(3)
590: prtMarkerSuppliesClass.1.4 (integer) supplyThatIsConsumed(3)
591: prtMarkerSuppliesClass.1.5 (integer) supplyThatIsConsumed(3)

592: prtMarkerSuppliesClass.1.6 (integer) supplyThatIsConsumed(3)
593: prtMarkerSuppliesType.1.1 (integer) tonerCartridge (21)
594: prtMarkerSuppliesType.1.2 (integer) tonerCartridge (21)
595: prtMarkerSuppliesType.1.3 (integer) tonerCartridge (21)
596: prtMarkerSuppliesType.1.4 (integer) tonerCartridge (21)
597: prtMarkerSuppliesType.1.5 (integer) transferUnit (20)
598: prtMarkerSuppliesType.1.6 (integer) fuser(15)
599: prtMarkerSuppliesDescription.1.1 (octet string) Black Print Cartridge HP C9730A
600: prtMarkerSuppliesDescription.1.2 (octet string) Cyan Print Cartridge HP C9731A
601: prtMarkerSuppliesDescription.1.3 (octet string) Magenta Print Cartridge HP C9733A
602: prtMarkerSuppliesDescription.1.4 (octet string) Yellow Print Cartridge HP C9732A
603: prtMarkerSuppliesDescription.1.5 (octet string) Image Transfer Kit HP C9734A
604: prtMarkerSuppliesDescription.1.6 (octet string) Image Fuser Kit HP 110V-C9735A, 220V-C9736A
605: prtMarkerSuppliesSupplyUnit.1.1 (integer) impressions(7)
606: prtMarkerSuppliesSupplyUnit.1.2 (integer) impressions(7)
607: prtMarkerSuppliesSupplyUnit.1.3 (integer) impressions(7)
608: prtMarkerSuppliesSupplyUnit.1.4 (integer) impressions(7)
609: prtMarkerSuppliesSupplyUnit.1.5 (integer) impressions(7)
610: prtMarkerSuppliesSupplyUnit.1.6 (integer) impressions(7)
611: prtMarkerSuppliesMaxCapacity.1.1 (integer) 13000
612: prtMarkerSuppliesMaxCapacity.1.2 (integer) 12000
613: prtMarkerSuppliesMaxCapacity.1.3 (integer) 12000
614: prtMarkerSuppliesMaxCapacity.1.4 (integer) 12000
615: prtMarkerSuppliesMaxCapacity.1.5 (integer) 120000
616: prtMarkerSuppliesMaxCapacity.1.6 (integer) 150000

Figure 12:
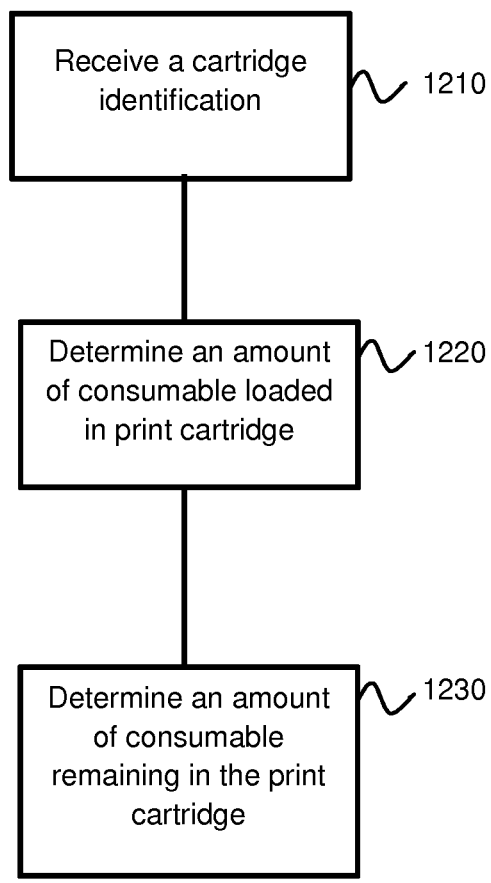
FIG. 12 illustrates a method of using the SNMP and MIB to determine the print yield of non-OEM print cartridge.

FIG. 12 illustrates a method of using the SNMP and MIB to determine the print yield of non-OEM print cartridge. The print cartridge remanufacture or provider fills a print cartridge with an amount of print consumable that is larger than an amount provided in a virgin OEM print cartridge. A cartridge identification is stored on a memory location of the print chip. The cartridge identification may identify the print cartridge provider as well as an amount of print consumable loaded into the cartridge. Using the SNMP, at step 1210 the MPS system determines that a memory location of the cartridge chip includes modified data, i.e. the cartridge identifier, that is different from the data of an OEM virgin print cartridge chip. At step 1220, the MPS reads the modified data and determines an amount of consumable loaded in the print cartridge and a new print yield for the cartridge. The new print yield can be determined as a percentage of the standard yield OEM cartridge. At step 1230, the MPS system determines an accurate amount of print consumable remaining throughout the life of the print cartridge by increasing the amount remaining for a standard yield cartridge by the determined percentage. This accurate amount of print consumable remaining is used to trigger the low print consumable remaining condition.

Figure 13:
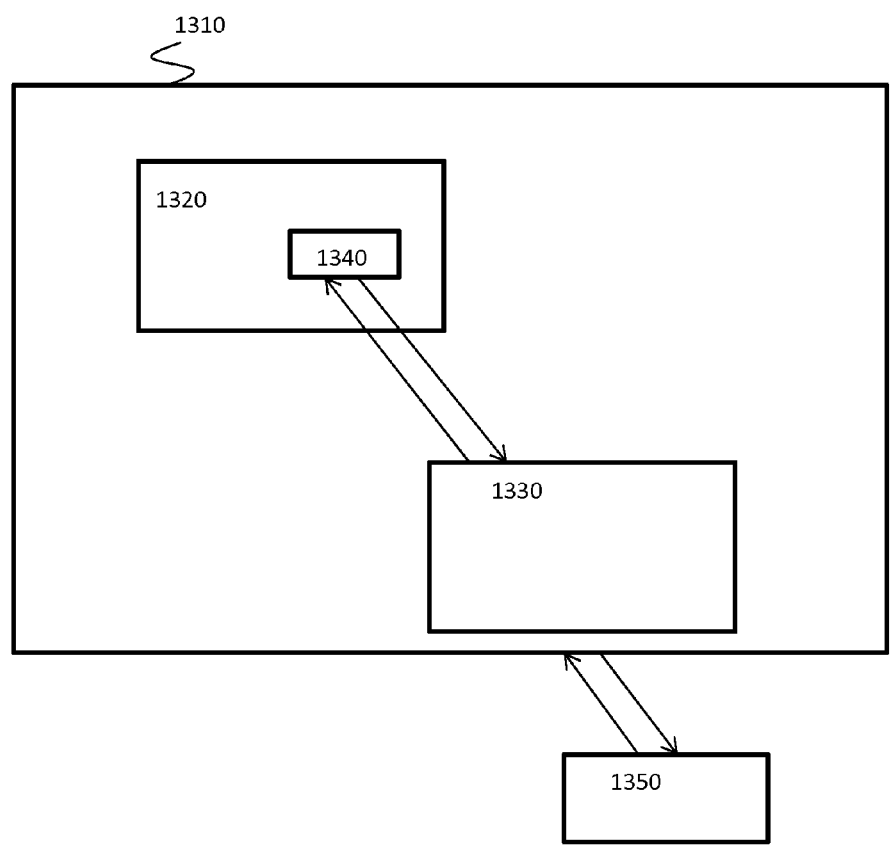
FIG. 13 illustrates a block diagram of a system configured to perform the method illustrated in FIG. 12.

FIG. 13 illustrates a system configured to implement the method illustrated in FIG. 12. A printing device 1310 includes a print cartridge 1320 and a processor 1330. The print cartridge 1320 includes a cartridge chip 1340 having a memory. The memory stores data that enables the print cartridge 1320 and stores the cartridge identifier therein. The processor 1330 communicates with the cartridge chip 1340. In many printers, the processor 1330 authenticates the cartridge 1320 based upon an authentication algorithm and information stored in the memory of the cartridge chip 1340. The processor 1330 and the cartridge chip 1340 communicate via the printer's MIB and the SNMP, as described above. The printer 1310 communicates with an external device 1350, such as a MPS system, a network device, or a processor.

For example, in one printer a location in the printer chip is directly output as an SNMP address. Replacing the characters stored in this printer chip location changes the characters reported by the printer chip. The print cartridge remanufacturer replaces the characters stored in this field with characters that are used to identify the remanufacturer, to indicate the amount of print consumable loaded in the print cartridge, or both. When the value from this location is read, a value that does not match expected OEM value is discovered. This in turn indicates to the MPS system that the cartridge is a high yield cartridge and the MPS system can then implement a method described above to determine an accurate print yield.

Using the SNMP and MIB as described above enables the storage of the identification to be tailored for different printers. The location in the printer chip can be varied for different printers. For example, in some printers the identification can be stored in a location that is used to indicate cartridge capacity. In other printers the identification can be stored in a location that indicates cartridge manufacturer, serial number, manufacturing date, or any other information that can be accessed by the printer. The advantage of this embodiment is that the cartridge remanufacturer or provider can indicate to the MPS provider the location of the print chip that contains the identifier. This enables the cartridge remanufacturer to tailor the print cartridge for the MPS provider.

In another embodiment, the MPS system is used to reset the printer chip in order to allow the print cartridge to continuing printing more pages than an OEM print cartridge. In this embodiment, the MPS system identifies the printer chip and a specific condition, such as low toner or such that a specific number of pages has been printed. The detected condition can be any desirable detectable condition. The MPS system sends a message to the MPS provider, the end user, or both, telling the end user to open the cover of the printer, power off the printer, or take out the cartridge and put it back in. The remaining count in the chip is then reset to a higher count. This can occur by changing the serial number, thereby making the printer think that a new cartridge has been inserted into the printer. Furthermore, the MPS system, or the printer chip, includes a chip reset counter. Each time the printer chip is reset, the chip reset counter is incremented to indicate that the printer chip has been reset. Once the chip reset counter reaches a predetermined count, the printer chip is no longer reset. This enables the MPS system to reset the printer chip only a specific number of times, and prevents the printer chip from being reset when the print cartridge is out of print material or by some entity other than the MPS system.

In another embodiment, the MPS system is configured to power off the printer to reset the printer chip without end user action. When a specific condition is detected, the MPS system powers off the printer, and the MPS system resets the printer chip. The printer chip is only reset when the specific condition is met. In this way, a printer chip is not reset every time the cover is opened or the printer is turned off.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for resetting a print chip mounted on a cartridge for use in a printing device, wherein the print cartridge has an identifier associated therewith and the print cartridge has an expected print yield that is different than an expected print yield of a standard yield cartridge manufactured for use in the printing device, the method comprising:
   determining that a print cartridge installed in a printing device has an identifier associated therewith;
   determining that a predetermined condition has been met; and
   providing a message indicating that the printing device should be powered off, wherein powering off the printing device after the predetermined condition has been met resets the print chip,
   wherein the identifier is stored in a memory located on the print cartridge,
   wherein the identifier is stored in a specific location in the memory, and
   wherein a management information base (MIB) database is utilized to identify the specific location in the memory.

2. A system for resetting a print chip mounted onto a print cartridge, the system comprising:
   a printing device having a print cartridge loaded therein, wherein the print cartridge has an identifier associated therewith, wherein the print cartridge has an actual expected print yield that is a percentage higher than a standard expected print yield of a standard yield cartridge manufactured for use in the printing device; and
   a processor configured to:
      determine that the print cartridge installed in the printing device has an identifier associated therewith;
      determine that a predetermined condition has been met; and
      provide a message indicating that the printing device should be powered off, wherein powering off the printing device after the predetermined condition has been met resets the print chip,
      wherein the identifier is stored in a memory located on the print cartridge,
      wherein the identifier is stored in a specific location in the memory, and
      wherein a management information base (MIB) database is utilized to identify the specific location in the memory.

* * * * *